Oct. 31, 1961     H. REIBELING     3,006,494
PISTON STOPPERS FOR AMPOULES
Filed Dec. 23, 1959
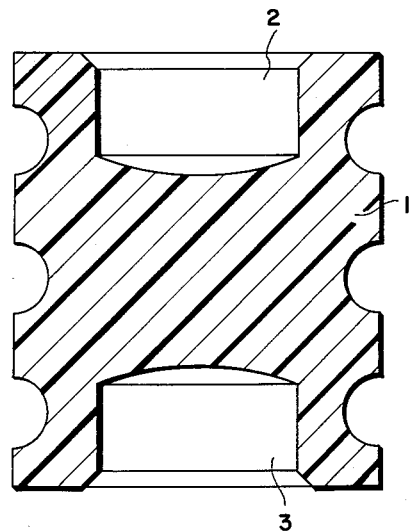

United States Patent Office 3,006,494
Patented Oct. 31, 1961

3,006,494
PISTON STOPPERS FOR AMPOULES
Helmut Reibeling, Frankfurt am Main, Germany, assignor to Farbwerke Hoechst Aktiengesellschaft vormals Meister Lucius & Bruning, Frankfurt am Main, Germany, a corporation of Germany
Filed Dec. 23, 1959, Ser. No. 861,559
Claims priority, application Germany Dec. 31, 1958
1 Claim. (Cl. 215—47)

The present invention relates to piston stoppers for ampoules that permit retraction, i.e. so-called aspiration.

It is already known to use in syringes for use with cylindrical ampoules rubber stoppers provided with a cavity at one end. This cavity allows the head of the piston rod to enter the stopper so that by swinging out spikes and the like of said head, the piston stopper and piston rod are firmly engaged. This efficient connection is necessary in order to permit so-called aspiration.

When filling and closing the ampoules automatically, it is problematical to insert the stopper in such a manner that the cavity shows outwardly. This requires a device which guarantees the correct introduction of the stopper. Operation with such devices proved, however, to be very uncertain.

The stopper according to the invention consisting of rubber or other elastic material, which is used as piston stopper of ampoules, for instance injection ampoules or injection cartridges avoids the disadvantage described above. It has small cavities or borings at both ends so that when automatically introducing the stopper it is completely immaterial which side is introduced first into the cylindrical ampoule.

In the accompanying drawing, a stopper 1 is shown as having cavities 2 and 3 for firm engagement with the piston head provided with hooks or spikes.

I claim:

Piston stopper for ampoules, said stopper being in the form of an elongated cylinder of solid elastic material, said cylinder having like cavities at each end and spaced peripheral grooves in the side thereof, each cavity having a diameter slightly greater than one half the diameter of the cylinder and a depth substantially one fourth the length of the cylinder, and the peripheral grooves being substantially semicircular in cross section and equally spaced from the ends of the cylinder.

References Cited in the file of this patent
FOREIGN PATENTS

| | | |
|---|---|---|
| 331,465 | Switzerland | July 31, 1958 |
| 527,206 | Italy | Nov. 24, 1952 |
| 1,130,500 | France | Feb. 6, 1957 |